United States Patent

Hudson et al.

[11] Patent Number: 5,961,622
[45] Date of Patent: Oct. 5, 1999

[54] SYSTEM AND METHOD FOR RECOVERING A MICROPROCESSOR FROM A LOCKED BUS STATE

[75] Inventors: John Michael Hudson; Donald L. Tietjen; Terry L. Biggs, all of Austin, Tex.

[73] Assignee: Motorola, Inc., Schaumburg, Ill.

[21] Appl. No.: 08/956,966

[22] Filed: Oct. 23, 1997

[51] Int. Cl.[6] .............................. G06F 13/36; G06F 9/46
[52] U.S. Cl. .......................... 710/107; 710/108; 713/502
[58] Field of Search ...................... 395/181, 287, 395/288, 726, 733, 557; 710/107, 108, 200, 260; 713/502

[56] References Cited

U.S. PATENT DOCUMENTS

| | | | |
|---|---|---|---|
| 4,247,894 | 1/1981 | Beismann et al. | 395/737 |
| 4,837,702 | 6/1989 | Obrea | 705/410 |
| 5,579,523 | 11/1996 | Tanaka | 395/726 |

*Primary Examiner*—Gopal C. Ray
*Attorney, Agent, or Firm*—Bruce E. Hayden; M. Kathryn Tsirigotis

[57] ABSTRACT

A data processing system (10) and method is used to recover a CPU from faulty operation. A single timer (38) is used to enable recovery operations. When the timer (38) experiences a first time-out event, a software watchdog interrupt (28) is generated. If the software interrupt (28) is properly handled before another consecutive/subsequent watchdog time out occurs, normal software execution will resume. However, if the software watchdog interrupt is not processed and the watchdog timer (38) experiences a second time-out event while the watchdog time-out interrupt (28) is pending, the timer (38) will generate a bus transfer termination signal (30) and set a status bit (270) within a watchdog status register (44). This assertion of termination signal (30) and the setting of the bit (270) allows the microprocessor to determine that a locked bus state exists. In response to the signal (30) and the bit (270), the locked bus (one or more of busses 22, 24, and/or 26) will attempt to recover from the locked bus state.

21 Claims, 3 Drawing Sheets

SYSTEM AND METHOD FOR RECOVERING A MICROPROCESSOR FROM A LOCKED BUS STATE

FIELD OF THE INVENTION

The present invention relates generally to microprocessor operation, and more particularly to, method for recovering a microprocessor from a locked bus state wherein the microprocessor does not have a bus protocol error detection signal.

BACKGROUND OF THE INVENTION

In the integrated circuit (IC) industry, bus protocols are used to communicate software instructions and data between a CPU core and external memory devices. Currently, microprocessors and microcontroller cores are capable of operating at frequencies in the range of hundreds of megahertz (e.g., 300 MHz). However, high performance bus operation is typically constrained to operational frequencies on the order of tens of megahertz (e.g., about 50 MHz). Therefore, the bus protocol used in a data processing system is typically a bottleneck to further improvement of system performance. In order to improve upon this performance bottleneck, whereby overall computer system performance can be improved, the simplifying of the bus protocol has become a goal in the integrated circuit industry. The simplification of the bus protocol reduces speed critical paths, reduces timing overhead, and generally speeds bus operation.

In addition, it is desirable in the integrated circuit industry to manufacture microcontrollers having a simplified cored design whereby less silicon surface area is used, thereby reducing manufacturing costs, and whereby power consumption can be reduced for longer battery life. In summary, many current microprocessor and microcontroller designs are removing control signals and timing complexity from bus protocols in order to improve upon bus system performance while simultaneously removing logic from CPU cores to enable more compact and efficient CPU EBB circuit area.

These two goals of simplifying the microprocessor bus protocol and reducing the amount of circuitry in a semiconductor CPU core create problems in current microcontroller design. For example, conventional bus transfer termination signals in the bus protocol are no longer available to terminate bus cycles when the bus is in a locked state. Therefore, this simplification process complicates bus lock recovery and may either complicate watch dog design or render current watch dog designs nonfunctional in the more modem (i.e., simplified) bus protocols.

In prior art watchdog and bus lock recovery systems, a first timer is a watch-dog timer which is used to control the occurrences of software interrupts within the data processing system. These software interrupts generated from a first set of time out events in the first timer are used to monitor software execution flow whereby the software interrupts can detect when software execution is locked in an improper execution path while the bus may still be in a proper unlocked functional mode. A second timer keeps track of second time periods and generates a second set of time out events that are used to terminate bus cycles when the bus hardware/protocol itself enters a locked bus state. In other words, the CPU may initiate a bus cycle on an external bus whereby this bus cycle never properly terminates due to some problem with the bus itself or peripherals attached to the CPU. When this locked state occurs, the second timer will time-out, forcing the bus to perform a termination operation whereby some form of functional bus operation can be eventually restored to the system. However, due to the process of simplifying bus protocols and shrinking a physical size of the CPU, two physical timers are no longer feasible for use in microcontroller designs to support these two separate functions.

Therefore, a need exists in the industry for a new microcontroller design which can support both timed bus cycle termination functions and software watchdog interrupts for simplified bus protocol while simultaneously achieving the advantageous result of reducing a complexity of the CPU core design and CPU bus protocol.

Figure 1:
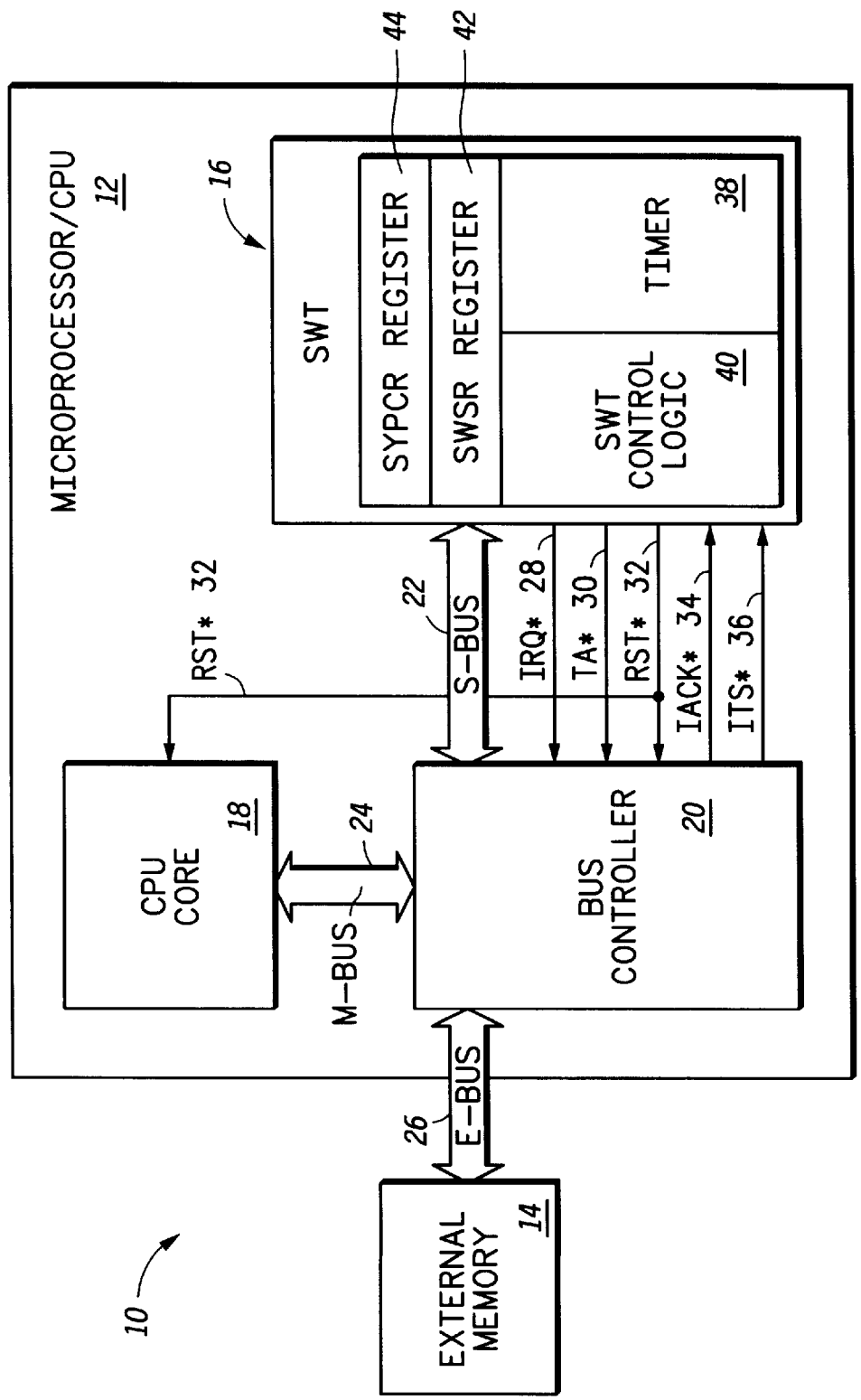
FIG. 1 illustrates, in a block diagram, a data processing system for recovering from bus lock in accordance with the present invention.

It will be appreciated that for simplicity and clarity of illustration, elements illustrated in the drawings, including timing information, have not necessarily been drawn to scale. For example, the dimensions of some of the elements are exaggerated relative to other elements for clarity. Further, where considered appropriate, reference numerals have been repeated among the drawings to indicate corresponding or analogous elements.

DETAILED DESCRIPTION OF THE PREFERRED EMBODIMENTS

The term "bus" will be used herein to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. It is well understood that signals can asserted either active high or active low. Signal names suffixed with a "*" in the drawings and specification are asserted active low and negated high in the preferred embodiment. However, this invention in no way depends on whether a specific signal is asserted active high or active low.

Generally, the present invention is a method for detecting and recovering from software execution errors and bus lock conditions. The system taught herein uses a bus protocol that has no bus transfer error acknowledge (TEA) signal whereby the removal of this signal has improved bus performance by simplifying the bus protocol. Due to this bus simplification, conventional two timer solutions to watchdog operations and bus lock recovery are not practical. The solution taught herein uses a single timer wherein various sequential time-out states of this timer along with various states of its corresponding control logic and status bits/signals allow the assertion of software watchdog interrupts, bus lock recovery transfer acknowledge signals, and optional last-resort system resets in an efficient manner without need for the TEA signals of the prior art.

Specifically, the user's code executed on the CPU taught herein is designed to execute such that predetermined value (s) (e.g., 55H (Hexidecimal) and AAH (Hexidecimal) consecutively written) are written to the watchdog timer service register periodically. If these predetermined value(s) are not written periodically to the timer register to reset the timer to a beginning count value, the watchdog timer will eventually encounter a first time out event. The first time out event will be due to one or more of: (A) a software execution error (e.g., the software failed to write the needed 55H and AAH or the software is caught in an improper infinite loop); or (B) a hardware error where the bus is locked or some like system error. At first, the processor herein assumes that (A) has occurred whereby some software execution error has occurred while the bus is still operating properly. Therefore, after the first time out event, the timer generates a watchdog interrupt to process/correct the software error. If properly corrected after the first time out, normal software execution may resume in the CPU and the assumption of a software error was correct.

However, if the assumption of the software error was not correct and a bus error or error (B) actually occurred in the data processing system, a second time out event of the watchdog timer will eventually occur with the interrupt request from the first time out event still pending. When this event is detected, the watchdog timer sets the processor into a mode which identifies bus lock as the system problem by setting a status bit and asserting a transfer bus termination acknowledge signal (TA). The system then attempts to terminate bus cycles via the asserted transfer acknowledge (TA) whereby bus operation may be eventually restored in an operational non-locked manner. If TA remains asserted until yet another (i.e., third) consecutive time out of the watchdog timer, or if a third consecutive time out occurs where the interrupt is still pending and the status bit indicates that a second time out had occurred, then an optional system reset may be initiated in an attempt to restore the processor to a functional state.

This solution allows the simplification of the bus protocol whereby the performance of a troublesome bottleneck in common computer architectures is improved while IC circuit area is simultaneously improved over the prior art. The sacrifice is that catastrophic failures may take the CPU several iterative time out events in order to detect or process. However, this trade-off of detection time prolonging versus lower power, reduced circuit area, and improved bus speed is advantageous for microcontroller designs.

The specifics of the invention can be further understood with reference to FIGS. 1–6 hereinbelow.

FIG. 1 is a block diagram illustrating a data processing system 10. The data processing system 10 includes a microprocessor 12 and external memory 14. Within the microprocessor 12 is a software watchdog timer circuit 16, a central processing unit (CPU) core 18, and a bus controller 20. The software timer 16 is coupled to the bus controller 20 by an S-bus 22. Bus controller 20 is coupled to CPU core 18 with an M-bus 24. The microprocessor 12 is coupled via bus controller 20 to other modules or peripherals, such as external memory 14, by an E-bus 26 in FIG. 1. The three buses shown, S-bus 22, M-bus 24, and E-bus 26, all have address, data, and control lines which are needed to enable effective communication between the circuit modules 16–20 of FIG. 1.

Software watchdog timer 16 has a timer 38 and control logic 40. It also contains two registers: a software watchdog service register (SWSR) 42, and a system protection control register (SYPCR) 44. The timer 16 performs a dual function of generating software watchdog interrupt requests when a first time out event occurs in timer 38 and generating watchdog bus transfer termination signal(s) in response to two or more consecutive time out events in the timer 38. Alternatively, a third function can provide that if a predetermined number of consecutive time outs occurs in the timer 38 without correcting the erroneous operation, a reset is initiated in the system 10 by the timer circuit 16. In particular, a software watchdog interrupt is generated upon a first time out event, the generation of watchdog bus transfer termination signal(s) occurs after the occurrence of two consecutive time out events in timer 38 and reset will be invoked after three consecutive unrecovered time out events within the timer 38. The timer may be reset by writing one or more predetermined value(s) (e.g., 55H and AAH consecutively) to the register 42 via user's executable software. When the register 42 is being written in this manner, the timer knows that user software execution is progressing normally and is not in error either due to erroneous software execution or hardware bus lock.

The timer is started at a predetermined value which is typically a reset condition such as zero. The time out may occur in the timer once the timer 38 overflows from FF. . . FFH (Hex) to 00 . . . 00H (Hex). However, comparators may be used to compare the contents of the timer 38 to predetermined programmable values which then trigger the time out event at predetermined time intervals. These time out events can be prevented or delayed by writing the register 42 as previously mentioned. The write of the 55H to the register 42 is latched, and the subsequent write of the AAH resets the timer 38.

In addition to S-bus 22, there are additional signals between the software watchdog timer 16 and the bus controller 20. The software watchdog timer 16 asserts a software watchdog interrupt request (IRQ*) 28 signal when the watchdog timer fires (i.e., "fires" being the occurrence of the time out event). A bus cycle termination signal (TA*) 30 is asserted by the software watchdog timer 16 to terminate bus cycles when the timer has experienced two consecutive time out events without proper CPU attention to the pending SWT interrupt. A reset (RST*) 30 signal can be asserted by the software watchdog timer 16 to reset the entire microprocessor 12 if three consecutive time out events are encountered by the system 10 without proper CPU attention/correction. If the interrupt request via IRQ* 28 is given proper attention by the system 10, then, in response to the interrupt request (IRQ*) 28, the bus controller 20 asserts an interrupt acknowledge (IACK*) 34 signal which invokes interrupt processing and terminates the interrupt request. Correct interrupt processing and interrupt termination will prevent two consecutive time outs, whereby the CPU can determine that bus lock has not occurred. The bus controller 20 asserts an internal transfer start signal (ITS*) 36 signal to indicate that a new bus cycle is beginning on the E-bus 26 and/or M-bus 24. The ITS* 36 signal may be asserted after the receipt of one or more TA* signals 30 whereby assertion of the TA* signal 30 indicates the end of a single bus cycle or a burst of bus cycles. After assertion of the TA* signal 30 has indicated that one or more bus cycles are complete, the ITS* signal 36 is free to be used to start one or more other bus cycles.

Figure 2:
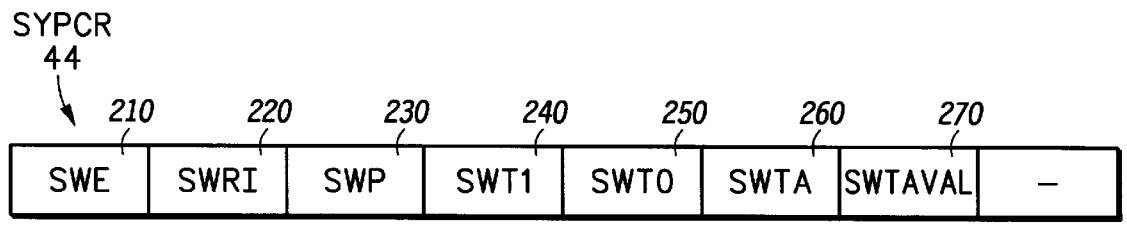
FIG. 2 illustrates, in a block diagram, a watchdog timer register for use in the data processing system of FIG. 1 lock in accordance with the present invention.

FIG. 2 is a diagram illustrating contents of the system protection control register 44 illustrated in FIG. 1. This register 44 controls the operation of the circuit 16 in FIG. 1. Seven bits are shown in the register 44 of FIG. 2. Register 44 contains a software watchdog enable (SWE) bit 210 which is set (or activated either active high or active low) to enable the operation of the software watchdog timer 16 and cleared (set inactive high or inactive low) to allow the processor 12 execute code without watchdog functions. A software watchdog reset/interrupt select (SWRI) 220 bit is set to cause a system reset whenever the software watchdog timer 38 exceeds the prespecified time out value/event, and is cleared to cause an interrupt on the IRQ* 28 line in lieu of a reset when time out events occur. In order to implement the novel dual function algorithm taught herein, the bit 220 should be set to a state which allows for generation of the interrupt request (IRQ*) line instead of a reset upon occurrence of a time out event. Register 44 contains a software watchdog prescaler (SWP) 230, software watchdog timing bits 1 and 2 (SWT 1) 240, and (SWT 0) 250. The bits 230, 240, and 250 together select the time-out period/count which is used for the software timer 38. The occurrence of a time out will cause either a reset or an interrupt, depending on the setting of the SWRI 220 bit in FIG. 2. A software watchdog transfer acknowledge (SWTA) bit 260 enables one of two modes of operation for the circuit 16 in FIG. 1. If set, the SWTA bit 260 allows circuit 16 to assert a transfer acknowledge (TA*) signal 30 if the IRQ* 28 request from a first time out event is not timely handled by the system 10. If clear, the bus transfer termination ability of the circuit 16 is disabled while the interrupt generation ability of the circuit 16 is still enabled by the bit 210. In other words, the setting of the SWTA bit 260 allows two sequential time outs of the timer 38 to generate a bus termination signal (TA*) 30 which then may attempt to recover from bus lock whereas clearing of the SWTA bit 260 will not allow for this function to be performed. Finally, a software watchdog transfer acknowledge valid (SWTAVAL) bit 270 indicates whether or not the software watchdog timer acknowledge (SWTA) 270 transfer acknowledge has or has not occurred. SWTAVAL is used internally by the SWTA 16 and is also used for notice to the CPU's interrupt routines since the bus termination acknowledge signal (TA) generated by the circuit 16 is deasserted once bus operation is functionally restored (i.e., once bus lock is reversed). Since this TA signal 30 from circuit 16 is transitory, a permanent record of the assertion of this signal is needed within system 10. Therefore, SWTAVAL 270 is a permanent storage location used to indicate to subsequently executed interrupt routines that TA* signal 30 was recently asserted by the software watchdog timer circuit 16 in order to attempt to recover from a bus lock condition.

Figure 3:
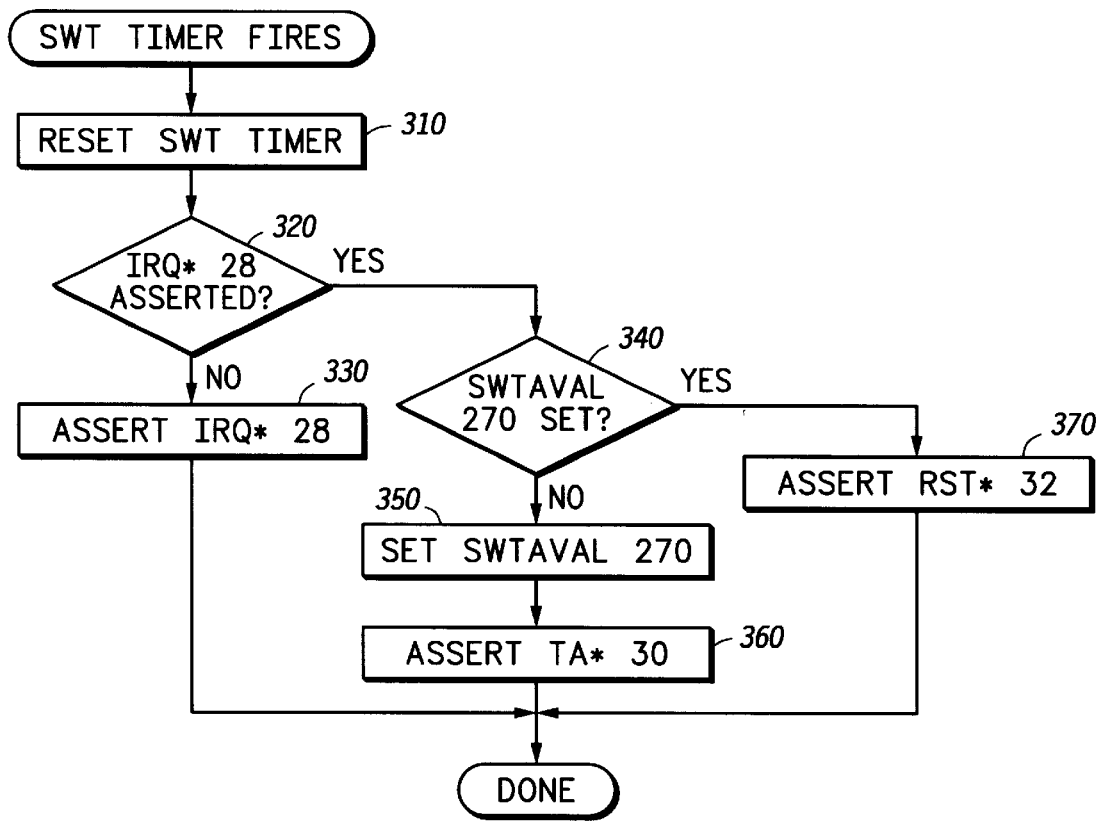
FIGS. 3–4 illustrate, in flowcharts, a method for recovering from bus lock using the system of FIG. 1 in accordance with the present invention.

FIG. 3 is a flow chart illustrating operating of control logic by the software watchdog timer control logic circuitry 40 when the timer 38 exceeds the one or more prespecified time-out values. First, the timer 38 is reset to zero or some predetermined start value via step 310. Next, it is determined whether the interrupt signal (IRQ*) is currently being asserted in step 320. If the interrupt (IRQ*) is not being asserted, it is determined that the time out event is the first time out event which follows no other previous and consecutive time out event. If this time out event is a first time out event, then the IRQ* signal 28 is asserted to enable a software watchdog interrupt request. If the time out event is a consecutive second or third time out event, then the step 340 is performed. The path of steps 310, 320, and 330 is a normal path for watchdog timer interrupts where only software execution errors have occurred (i.e., no bus lock up has been detected as of yet). However, if the interrupt (IRQ*) 28 is currently being asserted in step 320, then this indicates that one of the buses 22, 24, or 26 is hung since the previous first time out could not process the interrupt before a second time out has now occurred. It can thus be determined that the IRQ* has not been properly processed due to the fact that an acknowledge (IACK*) 34 has not been received for the previously asserted interrupt 28 (i.e., an asserted IRQ* signal 28 is still pending). At this point where at least two consecutive time-out events have occurred in the timer 38 without proper interrupt handling, a test is made whether the SWTAVAL 270 is set via a step 340. If the SWTAVAL bit 270 is not set, then it is set via step 350 to indicate that a bus lock state is probably occurring within the system. In addition, a transfer acknowledge (TA*) signal 30 is asserted via step 360 along with the setting of the SWTAVAL bit 270. The purpose of asserting the TA* signal 30 is to initiate termination of any locked bus conditions in an attempt to restore functional status to the locked bus. The SWTAVAL bit 270 is set to memorialize the fact that a TA* signal 30 was asserted because the TA* signal 30 will disable promptly once the bus unlocks with the beginning of a new bus cycle. If the CPU determines that: (1) the SWTAVAL bit 270 is already set upon a time out event; or (2) the TA* signal 30 is still being asserted along with IRQ* signal 28 assertion upon yet another time out event, then a third consecutive time out event must have occurred in the system 10. In this third time out, the TA* signal 30 has been unable to restore the hung bus to an unhung state. At this point, it is possible to assert the reset signal (RST*) 32 via a step 370 to reset the entire microprocessor 12 in an attempt to restore functional order to the system 10.

Figure 4:
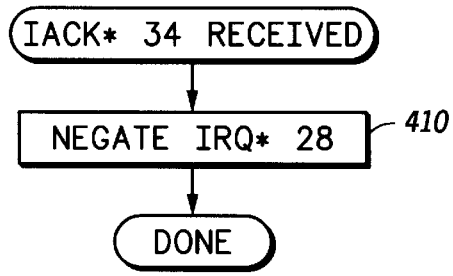

FIG. 4 is a flow chart that illustrates operation of receipt of an interrupt acknowledge (IACK*) signal 34. When the IACK* signal 34 is received by the software watchdog timer circuit 16, the software watchdog timer interrupt (IRQ*) signal 28 is negated via step 410 since the IACK* signal indicates that the interrupt request 28 was properly processed.

Figure 5:
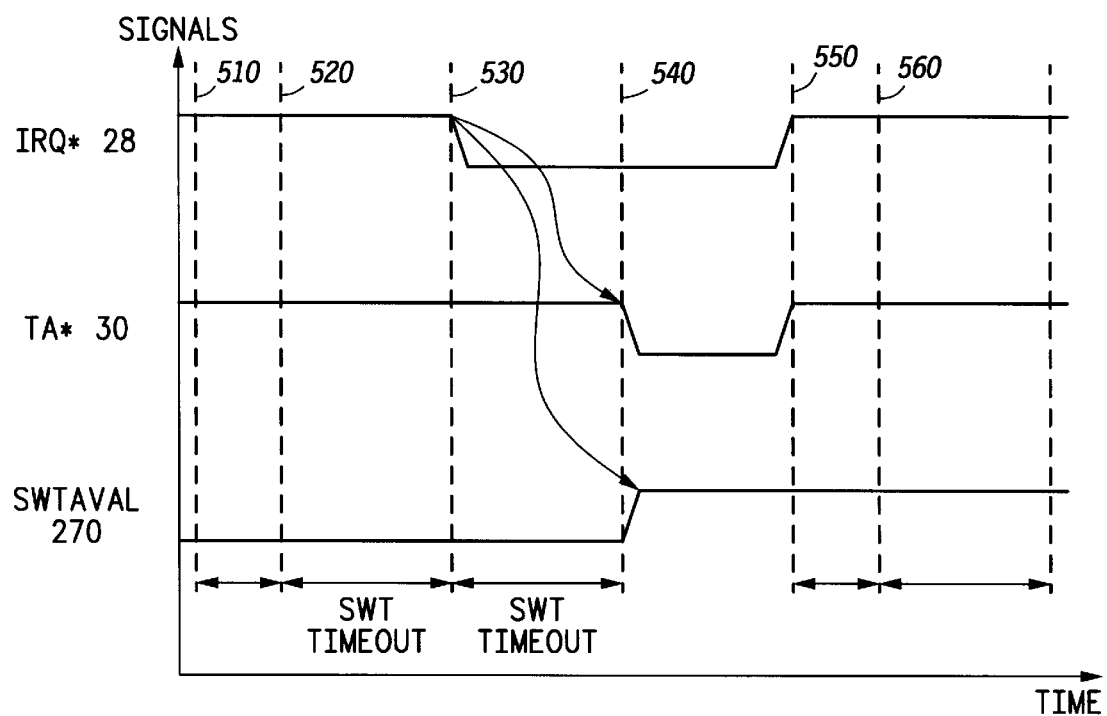
FIGS. 5–6 illustrate, in a timing diagram, the specific signal timing which may be used to recover from bus lock in accordance with the present invention.

FIG. 5 is a timing chart that illustrates normal operation of this invention. Along the left-hand axis, two timer output signals are shown: the SWT interrupt request (IRQ*) 28 and the SWT transfer acknowledge (TA*) 30. Also shown is the status of the SWTAVAL bit 270 from the SYPCR register 44. In a first time interval, started at time 510 and terminated by time 520, the timer 38 was started then reset by a store of 55H and then AAH to the SWSR register 42 before the prespecified time out value was reached. The timer 38 exceeds the prespecified time-out value at time 530 without being reset properly by write operation(s) to the SWSR register 42. At this time out point 530, the interrupt request (IRQ*) signal 28 is asserted in step 330 (see FIG. 3). FIG. 5 illustrates that the IRQ* signal 28 is not properly processed whereby the IACK* signal 34 is never asserted. Therefore, IRQ* signal 28 remains asserted and the interrupt is pending until time 540. At time 540 the timer 38 again exceeds the prespecified time-out value. This is the second consecutive time out without proper reset or interrupt handling and therefore the IRQ* signal 28 is still being asserted (see step 320). Due to the detection of this operational state, the SWTAVAL 270 bit is set after time 540 (see step 350), and the transfer acknowledge (TA*) signal 30 is asserted in an attempt to correct a locked bus state (see step 360). In FIG. 5, the transfer acknowledge (TA*) signal 30 has caused the locked bus to restore itself to proper operation by time period 550 and a third consecutive time out event is avoided. In other words, before time 550, the transfer acknowledge signal has been acknowledged, an internal transfer start (ITS*) signal 36 has been received indicating that the bus is no longer improperly locked, and an interrupt acknowledge (IACK*) signal 34 has been received indicating receipt of the interrupt (IRQ*) signal 28. Also, the timer circuit 16 has once again begun the proper cycle of resetting itself with proper writes to the SWSR register 42 or the corrective action of the bus lock problem may now be initiated on restored bus hardware.

Figure 6:
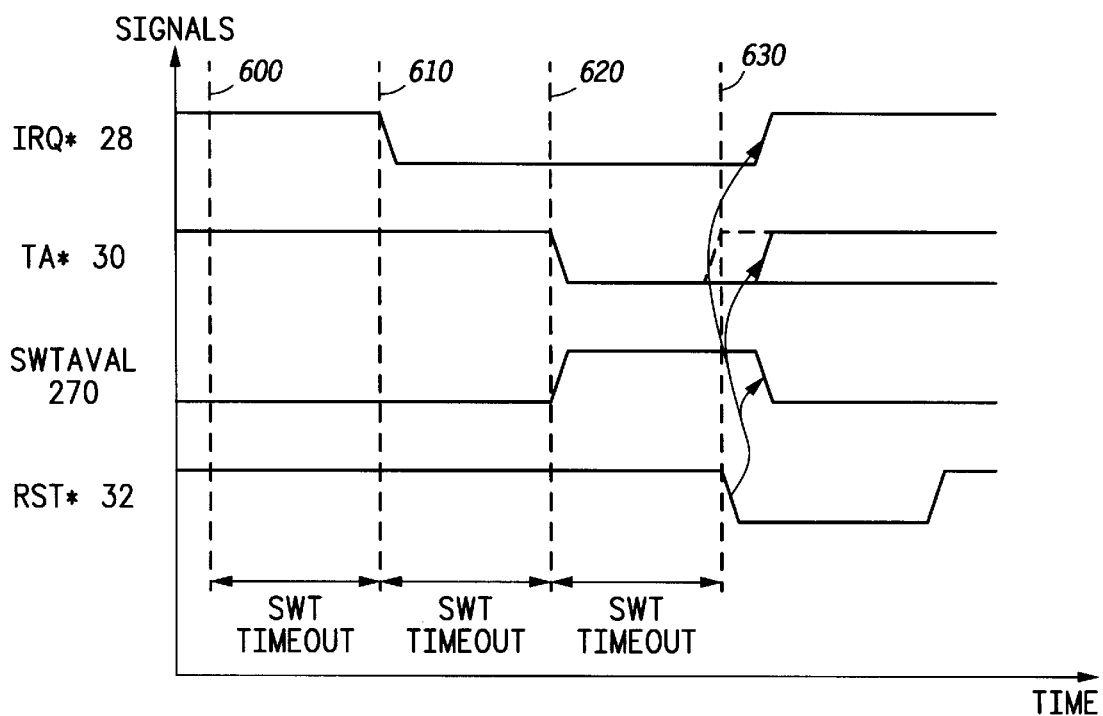

FIG. 6 is a timing diagram that illustrates reset functionality when the assertion of the transfer acknowledge signal (TA*) 30 assertion is not sufficient to unlock the improperly locked bus. After a first software timer time out period, between times 600 and 610, the SWT interrupt request (IRQ*) signal 28 is asserted to attempt to correct a software execution error. After the second time-out period expires, between times 610 and 620, the SWTAVAL bit 270 is set after time 620 and the transfer acknowledge (TA*) signal 30 is asserted to attempt to correct a locked bus error. At the end of the third time-out period, between times 620 and 630, if the bus is still locked despite the assertion of the transfer acknowledge (TA*) signal 30, a third consecutive time out period is encountered. In this case, the reset signal (RST*) 32 is asserted in an attempt to restore a functional bus to the system. This reset may be a partial reset of the system or an reset of the entire system 10 or entire processor 12. Note that the reset (RST*) signal 32 operates to negate the interrupt request (IRQ*) signal 28, and the transfer acknowledge (TA*) signal 30, and clears the SWTAVAL bit 270.

Those skilled in the art will recognize that modifications and variations can be made without departing from the spirit of the invention. For example, setting and clearing bits as used herein will clearly not limit the embodiment to active high or active low signals. Either active high or active low signals may be used herein to perform control functions in the system. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A data processing system comprising:
   a central processing unit (CPU) adapted to be coupled to a bus, the CPU generating bus cycles using the bus wherein the bus cycles are used to provide software instructions to the CPU in order to enable software execution by the CPU;
   a timer coupled to the CPU, the timer generating a watchdog interrupt at a first time to signify a software watchdog interrupt and generating a watchdog bus termination signal at a second time after the first interrupt, if the first interrupt is not processed, to signify that the bus is in a locked state; and
   a status bit internal to the data processing system, the status bit being activated along with the assertion of the watchdog bus termination signal for providing an indication that the watchdog bus termination signal was asserted.

2. The data processing system of claim 1 wherein the watchdog bus termination signal, once asserted, begins to terminate the bus cycles until an interrupt acknowledge signal, in response to the watchdog interrupt, is generated.

3. The data processing system of claim 1 wherein the watchdog interrupt invokes an interrupt routine wherein the interrupt routine accesses the status bit to determine if the watchdog bus termination signal was asserted.

4. The data processing system of claim 3 wherein the watchdog interrupt processes the interrupt as a software execution watchdog interrupt if the status bit is deactivated.

5. The data processing system of claim 3 wherein the watchdog interrupt processes the interrupt as bus recovery process if status bit is activated.

6. The data processing system of claim 1 wherein the data processing system is reset if the timer encounters a time out event while the watchdog bus termination signal is activated.

7. The data processing system of claim 1 wherein the watchdog bus termination signal is deactivated once the watchdog interrupt begins execution, and wherein the status bit remains asserted after the watchdog bus termination signal is deactivated.

8. The data processing system of claim 1 further comprising:
   a control bit stored in a control register to allow the timer to operate in a dual mode of operation wherein the control bit is activated to allow the timer to generate both the watchdog interrupts and the watchdog bus termination signals and wherein the control bit is deactivated to enable only the watchdog interrupt functionality of the timer.

9. The data processing system of claim 1 wherein the timer is reset by executing a software instruction that writes a predetermined value to a timer register.

10. The data processing system of claim 1 wherein the data processing system contains control bits that are programmable to set a time out duration of the timer.

11. The data processing system of claim 1 wherein the status bit, a first enable bit, and a second enable bit are all located in a watchdog register within the data processing system, the first enable bit enabling or disabling the timer entirely, and the second enable bit being used to selectively activate the use of the watchdog bus termination signal within the activated timer.

12. A method for recovering from a locked bus state in a data processing system, the method comprising:
   (a) beginning execution of software instructions by a central processing unit (CPU) within the data processing system, wherein the software instructions are communicated to the CPU by a bus;
   (b) generating a watchdog timer interrupt in response to a first time out condition occurring in a watchdog timer, the watchdog timer being internal to the data processing system;
   (c) attempting to handle the watchdog timer interrupt within the data processing system;
   (d) generating, if the watchdog timer interrupt is not properly handled in step (c), a watchdog bus termination signal in response to a second time out condition occurring in the watchdog timer;
   (e) setting a watchdog status bit internal to the data processing system in response to an assertion of the watchdog bus termination signal in step (d); and
   (f) attempting to terminate at least one bus cycle in response to the assertion of the watchdog bus termination signal in an attempt to recover the bus from a locked bus state.

13. The method claim 12 wherein the step (a) further comprises:
   using normal software execution to write a predetermined value to a watchdog timer register wherein the write resets the watchdog timer.

14. The method claim 12 wherein the step (c) further comprises:

generating an interrupt acknowledge signal if the watchdog timer interrupt is properly handled whereby the interrupt acknowledge signal is used in step (d) to determine if the watchdog timer interrupt was properly handled.

15. The method of claim 12 further comprising:

(g) generating, in response to a third time out condition occurring while the watchdog bus termination signal is activated, a reset signal which resets the data processing system.

16. The method of claim 12 further comprising:

(g) generating, in response to a third time out condition occurring while the watchdog timer interrupt is pending and the watchdog status bit is set, a reset signal which resets the data processing system.

17. The method of claim 12 further comprising:

(g) processing the watchdog timer interrupt through software and disabling the watchdog status bit after step (f) successfully unlocks the bus.

18. A data processing system comprising:

a central processing unit adapted to be coupled to a bus; and a watchdog timer coupled to the central processing unit, wherein the watchdog timer (1) generates a software watchdog interrupt, in response to a first time out event of the watchdog timer, to ensure correct software execution over time, and (2) generates a bus termination signal, in response to a second time out event of the watchdog timer, for recovering the data processing system from a locked bus state.

19. A data processing system comprising:

a central processing unit adapted to be coupled through a bus to memory;

a watchdog timer coupled to the central processing unit; and a watchdog control register coupled to the watchdog timer and having a plurality of bits comprising:

a first enable bit for enabling or disabling use of the watchdog timer within the data processing system;

a second enable bit for selecting a mode of operation of the watchdog timer when the watchdog timer is enabled by the first enable bit;

at least one bit for determining a time period from a watchdog timer reset to a watchdog timer time-out for the watchdog timer; and a status bit which is activated when the watchdog timer generates a bus transfer termination signal.

20. The data processing system of claim 19 wherein the watchdog timer is enabled by the second enable bit to operate in one of two modes of operation, a first mode of operation allowing generation of a software watchdog interrupt by the watchdog timer in response to a first time-out event of the watchdog timer, to ensure correct software execution over time, while the watchdog timer is not enabled to generate a bus transfer termination signal, and a second mode of operation allowing the watchdog timer to generate the bus transfer termination signal in addition to an ability to generate a software watchdog interrupt.

21. The method of claim 20 wherein the second mode of operation performs a reset operation in the data processing system if repeated watchdog time-out events consecutively occur in the watchdog timer.

\* \* \* \* \*